Dec. 28, 1948. E. K. BAKER Re. 23,067
PUMP
Original Filed Jan. 30, 1946
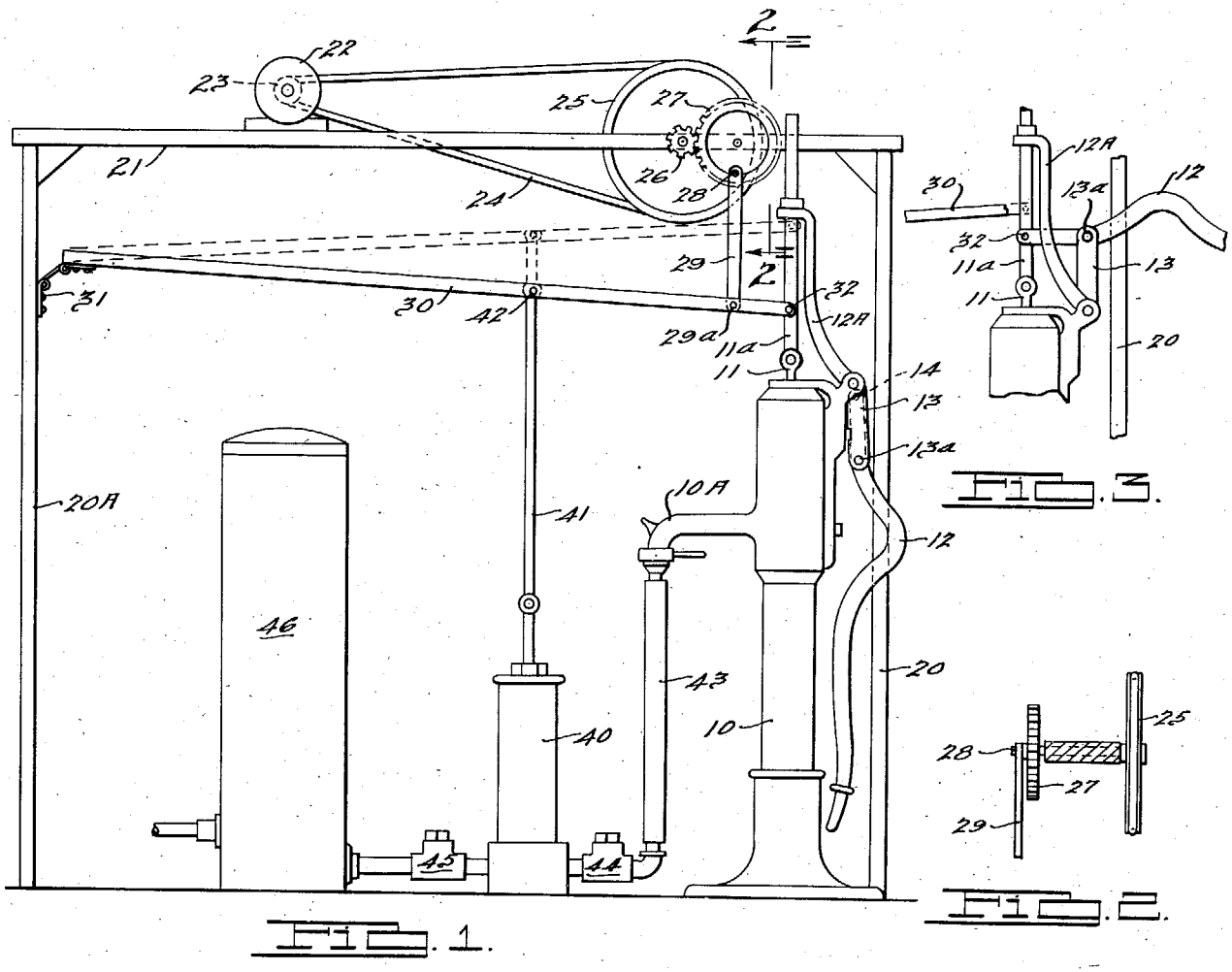
INVENTOR.
Erle K. Baker.
BY
Elmer Jamison Gray
ATTORNEY.

Reissued Dec. 28, 1948

Re. 23,067

UNITED STATES PATENT OFFICE 23,067

PUMP

Erle K. Baker, Detroit, Mich., assignor to Baker Axle Company, Cleveland, Ohio, a corporation of Ohio Original No. 2,429,384, dated October 21, 1947, Serial No. 644,363, January 30, 1946. Application for reissue December 13, 1947, Serial No. 791,571

11 Claims. (Cl. 103—5)

The present invention relates to pumps and more specifically to pump operating means.

One of the objects of the invention is to provide power driven pump operating means which is adapted to be applied to existing hand operated lift pumps to enable the delivery of the water under pressure.

Another object is to provide operating means including a pressure pump adapted to operate in series with the hand operated lift pump.

Another object is a pump mechanism which, while permanently installed adjacent the lift pump, may be quickly disconnected so that the lift pump may be hand operated, and may be just as easily and quickly connected again for power operation.

Other objects and advantages will be apparent to those skilled in the art upon reference to the following description and the accompanying drawings in which Fig. 1 is a side elevation of the power operated pump mechanism in operative relation to the pump.

Fig. 2 is a section on line 2—2 of Fig. 1.

Fig. 3 is a fragmentary side elevation illustrating the pump mechanism arranged for hand operation.

In the drawings a conventional hand operated lift pump is shown at 10, this being provided with the usual pump cylinder and water pipe extending down in the well and not shown.

The pump plunger is as usual operated by the rod 11 extending down through the pump body and reciprocable by means of the handle 12, this being a lever fulcrumed at 13A on the link 13 and adapted to be connected to rod 11, or an extension 11*a* thereof, by the usual clevis and a removable pin insertable through a hole 14 therein and also through a hole in the extension 11*a*. The rod 11 is as usual guided in a suitable upright 12A.

Erected adjacent the pump 10 is a frame consisting of uprights 20—20A, and an upper cross member 21 supported thereon; and, on the frame, preferably on the cross member 21 is supported an electric motor 22 carrying a small pulley 23, which through belt 24 is adapted to drive a large pulley 25.

The latter, pulley 25, is carried on one end of a short shaft, extending across frame member 21 in suitable bearings, on the other end of which is fixed a small pinion 26 meshing with a large pinion 27 also mounted on member 21.

The pinion 27 is provided with a suitable eccentrically located pin 28 adapted to coact with a pitman 29 extending down to a suitable pivotal connection 29*a* with a lever 30, which is pivoted to frame upright 20A at 31, the pivot means being a short link so as to allow a small longitudinal movement of the lever in its reciprocation by pitman 29. The other end of lever 30 will be pivoted, as by a pin 32, to the extension 11*a* of the pump plunger rod 11 from which the handle 12 is preferably detached. The same hole or opening in extension 11*a* may be used for the pin 32 which connects either the handle 12 or the lever 30.

Operation of the motor 22 will, of course, reciprocate the pump plunger and thereby lift water from the well in which the pump is installed. In order, however, to deliver such water under sufficient pressure, a second pump 40 is used and the plunger 41 of this is also connected pivotally, as at 42, to the lever 30, so that the two pumps 10 and 40 are actuated simultaneously by the motor 22.

An easily detachable flexible conduit 43 extends from the delivery spout 10A of pump 10 to the intake valve 44 of pump 40, and from the outlet valve 45 of the latter a suitable conduit leads to a pressure storage tank 46, from which the water may, of course, be piped to the point or points of use.

The capacity of the pump 40 should be such as to accommodate the delivery from pump 10, and by arranging the two pump plungers as indicated, the weight of the plunger in pump 10 assists the pumping action of pump 40.

If, for any reason, the motor 22 becomes inoperative, the pump 10 may be quickly put into use for manual operation merely by removing pin 32 to disconnect the lever 30 from extension 11*a* and connecting the pump handle 12 to extension 11*a* by means of pin 32 in the manner shown in Fig. 3. At the same time the conduit 43 is disconnected from the pump.

Further, it is obvious that pump 40 may, if desired, be set in a suitable pit below the frost line and that the tank 46 may be located wherever is desirable and convenient.

I claim:

1. In combination with a conventional hand operated reciprocating plunger containing lift pump, means for providing delivery under pressure, said means consisting of a frame, a motor mounted thereon, a lever pivoted at one end to said frame, actuating means connecting said motor and lever whereby to oscillate the latter, a pressure pump operably connected to said lever, means on said lever to connect the same with the plunger of said lift pump, and conduit means for connecting the delivery means of said lift pump to the inlet of said pressure pump.

2. In combination with a conventional hand operated reciprocating plunger containing lift pump, means for providing delivery under pressure, said means consisting of a frame, a motor mounted thereon, a lever pivoted to said frame, actuating means connecting said motor and lever whereby to oscillate the latter, a pressure pump operably connected to said lever, means on said lever to connect the same with the plunger of said lift pump, and conduit means for connecting the delivery means of said lift pump to the inlet of said pressure pump.

3. Power operated mechanism for use in combination with a conventional hand operated reciprocating plunger containing lift pump, comprising a motor, an oscillatable lever, actuating means connecting said motor and lever whereby to oscillate the latter, a pressure pump operably connected to said lever, means for connecting said lever with the plunger of said lift pump, and conduit means for connecting the delivery means of said lift pump to the inlet of said pressure pump.

4. Power operated mechanism for us in combination with a conventional hand operated reciprocating plunger containing lift pump, comprising a motor, an oscillatable lever, actuating means connecting said motor and lever whereby to oscillate the latter, a pressure pump operably connected to said lever, means for connecting said lever with the plunger of said lift pump, conduit means for connecting the delivery means of said lift pump to the inlet of said pressure pump, a pressure tank, and conduit means for connecting the outlet of said pressure pump to said tank.

5. In combination with a conventional hand operated reciprocating plunger containing lift pump, means for providing delivery under pressure from said pump, said means comprising a motor, an oscillatable lever, actuating means connecting said motor and lever whereby to oscillate the latter, a pressure pump, means for operably connecting said lever and pressure pump, means for operably connecting said lever and the plunger of said lift pump, and conduit means for connecting the delivery means of said lift pump to the inlet to said pressure pump.

6. In combination with a conventional hand operated reciprocating plunger containing lift pump, means for providing delivery under pressure from said pump, said means comprising a motor, an oscillatable lever, actuating means connecting said motor and lever whereby to oscillate the latter, a pressure pump, means for operably connecting said lever and pressure pump, means for operably connecting said lever and the plunger of said lift pump, conduit means for connecting the delivery means of said lift pump to the inlet of said pressure pump, a pressure tank, and conduit means for connecting the outlet of said pressure pump to said tank.

7. In combination with a reciprocating plunger containing lift pump, mechanism for providing delivery under pressure from said pump, said mechanism comprising a motor, an oscillatable lever, actuating means connecting said motor and lever whereby to oscillate the latter, a pressure pump operably connected to said lever, means adapted for operably connecting said lever with the plunger of said lift pump, and conduit means adapted for connecting the delivery means of said lift pump to the inlet of said pressure pump.

8. In combination with a reciprocating plunger containing lift pump, mechanism for providing delivery under pressure from said pump, said mechanism comprising a motor, an oscillatable lever adapted for detachably connecting with the plunger of said lift pump for actuation thereof, actuating means connecting said motor and level whereby to oscillate the latter, a pressure pump operably connected to said lever, and conduit means adapted for detachably connecting the delivery means of said lift pump to the inlet of said pressure pump.

9. Means for providing delivery under pressure from a reciprocating plunger containing lift pump and comprising a motor, a swinging lever, means for connecting the motor to said lever to swing the latter, a pressure pump, means for operably connecting said lever to said pressure pump, means adapted for detachably connecting said lever to the plunger of the lift pump, and conduit means adapted for detachably connecting the delivery means of said lift pump to the inlet of said pressure pump.

10. Means for providing delivery under pressure from a reciprocating plunger type lift pump and comprising a pressure pump, a power driven motor for said pressure pump, conduit means adapted for detachably connecting the delivery means of the lift pump to said pressure pump, and mechanism adapted for detachably connecting said motor to the plunger of said lift pump whereby to reciprocate said plunger.

11. In combination with a lift pump having a reciprocating plunger, a power driven motor, a pressure pump, conduit means detachably connecting the delivery means of the lift pump to said pressure pump, means for operably connecting said motor to said pressure pump, and mechanism for detachably connecting said motor to said plunger whereby to reciprocate said plunger and comprising a rotatable wheel and reciprocating means eccentrically connected to said wheel.

ERLE K. BAKER.

REFERENCES CITED

The following references are of record in the file of this patent:

UNITED STATES PATENTS

| Number | Name | Date |
|---|---|---|
| 1,571,915 | Frier | Feb. 2, 1926 |